(12) United States Patent
Sakai

(10) Patent No.: US 7,596,640 B2
(45) Date of Patent: Sep. 29, 2009

(54) COMPUTER PROGRAM PRODUCT FOR MANAGING CONNECTIONS

(75) Inventor: Hiroki Sakai, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 322 days.

(21) Appl. No.: 11/230,654

(22) Filed: Sep. 21, 2005

(65) Prior Publication Data

US 2006/0129668 A1 Jun. 15, 2006

(30) Foreign Application Priority Data

Sep. 21, 2004 (JP) ............................. 2004-273222

(51) Int. Cl.
*G06F 9/00* (2006.01)
*G06F 15/00* (2006.01)
(52) U.S. Cl. .................. 710/31; 370/257; 370/451; 709/223
(58) Field of Classification Search ............... 710/36, 710/38, 305; 370/235, 254, 340, 395.1; 700/17; 715/735
See application file for complete search history.

(56) References Cited

U.S. PATENT DOCUMENTS

| | | | | |
|---|---|---|---|---|
| 5,883,621 A | * | 3/1999 | Iwamura ...................... | 725/37 |
| 6,233,611 B1 | * | 5/2001 | Ludtke et al. ................ | 709/223 |
| 6,275,889 B1 | * | 8/2001 | Saito .......................... | 710/313 |
| 6,421,069 B1 | * | 7/2002 | Ludtke et al. ................ | 715/762 |
| 6,493,769 B1 | * | 12/2002 | Kawamura et al. ............. | 710/3 |
| 6,496,862 B1 | * | 12/2002 | Akatsu et al. ................ | 709/224 |
| 6,529,951 B1 | * | 3/2003 | Okuyama et al. ............ | 709/223 |
| 6,825,858 B2 | * | 11/2004 | Sato ........................... | 715/735 |
| 6,937,599 B1 | * | 8/2005 | Yoshida et al. .............. | 370/390 |
| 7,042,896 B1 | * | 5/2006 | Kim et al. .................... | 370/461 |
| 7,058,679 B2 | * | 6/2006 | Okuyama et al. ........... | 709/223 |

(Continued)

FOREIGN PATENT DOCUMENTS

JP 2000-322354 A 11/2000

(Continued)

OTHER PUBLICATIONS

Philips Semiconductor, Enhanced Full Duplex A/V Link Layer IEEE 1394 Reference Design Kit User's Manual, Ver. 2.2.1, Philips Semiconductor, 2000, pp. 1-77.*

(Continued)

*Primary Examiner*—Henry W. H. Tsai
*Assistant Examiner*—Cheng-Yuan Tseng
(74) *Attorney, Agent, or Firm*—Crowell & Moring LLP

(57) ABSTRACT

A computer program product for managing connections comprises a computer readable storage medium having the following computer instructions. The instructions cause a controller to perform: outputting an image including icons representing respective devices connected to an IEEE 1394 serial bus to display means; and establishing a logical connection between two of the connected devices by updating the contents of iPCR and oPCR stored in register spaces in the two connected devices and updating data for management of a band and a channel that is stored in a register space provided in an isochronous resource manager, which is a node for isochronous resource management on the IEEE 1394 serial bus, when a user enters a selection of the two connected devices to be logically connected to each other from among the connected devices on the bus.

10 Claims, 21 Drawing Sheets

U.S. PATENT DOCUMENTS

| | | | |
|---|---|---|---|
| 7,490,293 B1* | 2/2009 | Humpleman et al. | 715/734 |
| 2002/0016882 A1* | 2/2002 | Matsuuchi et al. | 710/305 |
| 2003/0101254 A1* | 5/2003 | Sato | 709/223 |
| 2005/0013252 A1* | 1/2005 | Ono et al. | 370/235 |
| 2005/0025107 A1* | 2/2005 | Usuba | 370/340 |

FOREIGN PATENT DOCUMENTS

| | | |
|---|---|---|
| JP | 2002-077179 A | 3/2002 |
| JP | 2002-217906 A | 8/2002 |
| JP | 2002-305527 A | 10/2002 |
| JP | 2003-046509 A | 2/2003 |
| JP | 2003-216516 A | 7/2003 |

OTHER PUBLICATIONS

Teener, IEEE 1394-1995 High Performance Serial Bus, Zayante Inc., 1998, pp. 1-53.*

Japanese Office Action dated Oct. 10, 2006 including English translation (three (3) pages).

* cited by examiner

FIRST SELF-ID PACKET 70

SECOND SELF-ID PACKET 73

THIRD SELF-ID PACKET 74

COMPUTER PROGRAM PRODUCT FOR MANAGING CONNECTIONS

BACKGROUND OF THE INVENTION

1. Field of the Invention

The present invention relates to a computer program product for managing logical connections between devices connected to an IEEE 1394 serial bus (hereinafter referred to simply as "bus").

2. Description of the Related Art

Today, there is increasing use of networks in which audio and video devices are connected to each other via an IEEE 1394 serial bus cable (hereinafter referred to simply as "cable"). In this kind of network, connected devices in the network are unable to send and receive stream data such as e.g. video signals and audio signals between them when they are only physically connected to the network via the cable. More particularly, in order for the connected devices to send and receive stream data between them, it is necessary to establish a logical connection between a connected device to send stream data and a connected device to receive the stream data in accordance with the IEC 61883-1 standard. Commercially available controllers are designed to, for example, establish a logical connection between a target device and the controller automatically by background processing when the controller causes the target device to start playing and to release the logical connection automatically by background processing when the controller causes the target device to stop playing, so that the logical connection is transparent to a user.

However, the above described method of establishing and releasing a logical connection between connected devices on a bus automatically by background processing has the disadvantage of prohibiting a user from checking whether or not the logical connection has been successfully established between the connected devices. This may cause the user to be anxious about whether or not stream data can be appropriately sent and received between the relevant connected devices.

It is relatively easy for a conventional controller to establish a logical connection between the controller itself and its target device. For example, assuming that the controller is a hard disk recorder, a logical connection with a target device is established in the following manner. When a user selects a Dubbing button 101 shown in FIG. 23, the controller displays a window 102 for showing a list of target devices to which a target file can be copied. Subsequently, when the user selects a target device (a button 103 representing the target device) to which the file is to be copied from among the target devices displayed in the window 102, the controller automatically establishes the logical connection between the selected target device and the controller itself. However, one problem associated with the conventional controller is that it cannot establish a logical connection between a freely-selected combination of target devices.

Japanese Laid open Patent Publication 2003-216516 discloses a device designed to, upon selection of an output device from an output device list, display whether or not the selected output device can be logically connected with each of input devices in an input device list, and to logically connect the selected output device with an input device selected from among input devices that are indicated as being logically connectable with the output device. Such a device may be able to establish a logical connection between a freely-selected combination of target devices, but it also has the above described disadvantage of prohibiting a user from checking whether or not a logical connection has been successfully established between connected devices. Further, the device is not designed to display listing data concerning the devices connected to the bus in such a format that can show physical and logical connections existing between the connected devices. Accordingly, it is not easy for a user to know which connected devices have to remain physically connected to each other in order to maintain a currently active logical connection.

SUMMARY OF THE INVENTION

An object of the present invention is to provide a computer program product for managing connections between devices connected to an IEEE 1394 serial bus that allows a controller to establish a logical connection between a freely-selected combination of target devices as well as allowing a user to easily check whether or not a logical connection has been successfully established between connected devices.

According to an aspect of the present invention, we provide a computer program product for managing connections between devices connected to an IEEE 1394 serial bus, the computer program product comprising a computer readable storage medium having computer instructions for causing a controller to perform: outputting an image including icons representing the respective connected devices on the IEEE 1394 serial bus to display means; and establishing a logical connection between two of the connected devices by updating contents of iPCR and oPCR stored in register spaces in the two connected devices and updating data for management of a band and a channel that is stored in a register space provided in an isochronous resource manager when a user enters a selection of the two connected devices to be logically connected to each other from among the connected devices on the IEEE 1394 serial bus, the isochronous resource manager being a node for isochronous resource management on the IEEE 1394 serial bus.

By performing the above computer instructions, the controller can establish a logical connection between connected devices that are selected by a user to be logically connected to each other not only when the selected devices are the controller and a target device but also when they are both target devices. In other words, the controller can establish a logical connection between a freely-selected combination of connected devices on the IEEE 1394 serial bus.

Preferably, the computer instructions cause the controller to output the image including the icons representing the respective connected devices in such a format that can show physical and logical connections existing between the connected devices on the IEEE 1394 serial bus. This allows a user to easily check whether or not the logical connection has been successfully established between the two connected devices. Besides, the user can easily know which connected devices have to remain physically connected to each other in order to maintain a currently active logical connection.

Preferably, the computer instructions cause the controller to perform: reading a topology map from a bus manager that is a node for managing the IEEE 1394 serial bus, the topology map containing information concerning the physical connections existing between the connected devices on the IEEE 1394 serial bus; and editing the image including the icons representing the respective connected devices based on the content of the read topology map.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof wherein.

Each of FIG. 12, FIG. 13, FIG. 14, FIG. 15, FIG. 16, FIG. 17, FIG. 18, FIG. 19, FIG. 20, FIG. 21

DESCRIPTION OF THE PREFERRED EMBODIMENT

Referring now to the accompanying drawings, the preferred embodiment of the present invention is described. The present invention relates to a computer program product for managing logical connections between devices connected to an IEEE 1394 serial bus (hereinafter referred to simply as "bus"). In the embodiment described below, a controller in which a connection manager program according to the present invention is installed is a set-top box. It is to be noted that the following description of preferred embodiment of the present invention has been presented for purposes of illustration and description, and is not intended to be exhaustive or to limit the present invention to the precise form disclosed.

Figure 1:
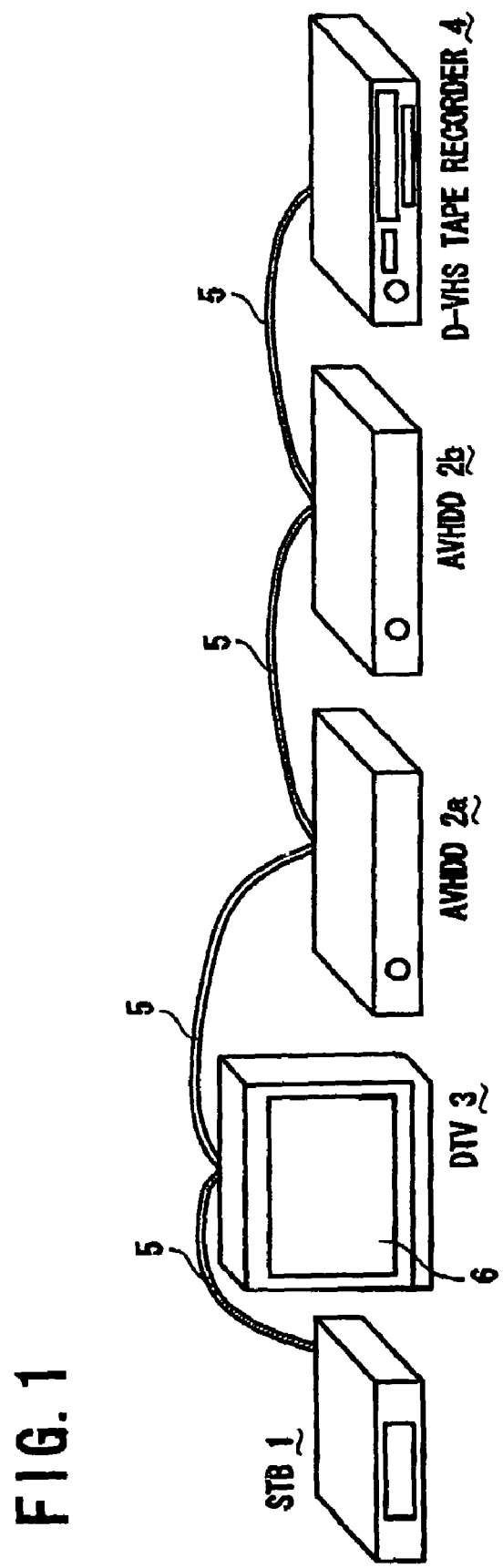
FIG. 1 is a schematic perspective view showing a set-top box in which installed is a connection manager program according to one embodiment of the present invention, and showing audio/video hard disk drives (AVHDD), a digital television (DTV), and a data-video home system (D-VHS) tape recorder that are connected to the set-top box.

FIG. 1 schematically shows an external view of the set-top box, in which installed is the connection manager program according to the present invention, connected to two AVHDDs, a digital television (DTV), and a data-video home system (D-VHS) tape recorder. The set-top box (hereinafter referred to as "STB") 1 is a device that outputs a broadcast signal on a user-selected channel among received broadcast signals. The AVHDD 2a or 2b is a hard disk recorder of a type that is capable of recording or reproducing data in response only to a control command conforming to the IEEE 1394 standard. A monitor 6 (claimed display means) of the DTV 3 is used to display e.g. a screen for managing connections between devices connected to the bus (see FIGS. 12 to 22). The STB 1 and the DTV 3, the DTV 3 and the AVHDD 2a, the AVHDD 2a and the AVHDD 2b, and the AVHDD 2b and the D-VHS tape recorder 4 are connected by IEEE 1394 serial bus cables hereinafter referred to simply as "cables") 5. More particularly, the STB 1, the DTV 3, the AVHDDs 2a and 2b, and the D-VHS tape recorder 4 are connected by a daisy chain mode.

Figure 2:
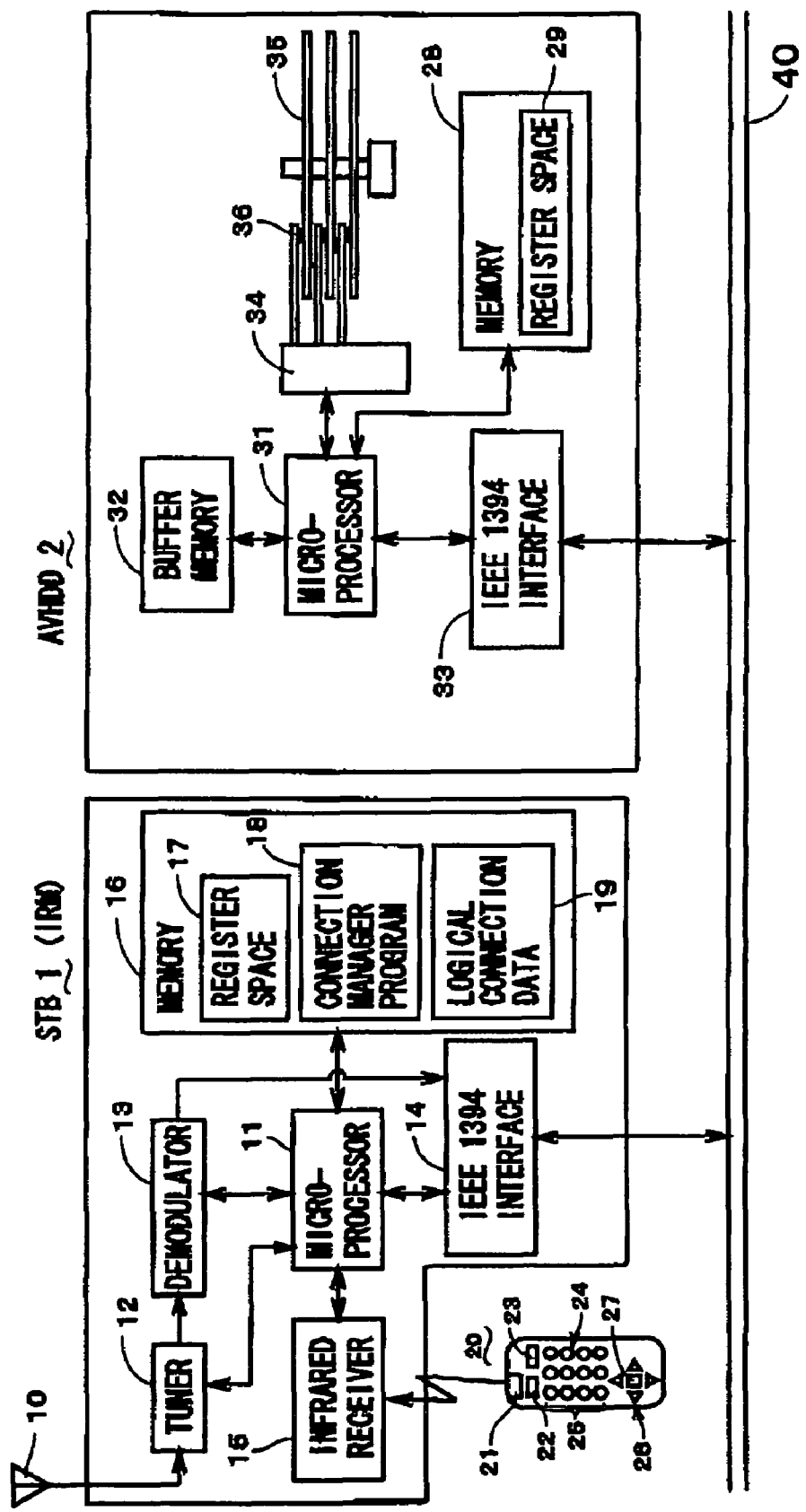
FIG. 2 is an electrical block diagram showing the set-top box and the AVHDD.

Referring now to FIG. 2, the electrical configuration of the STB 1 and the AVHDDs 2a and 2b is described. In FIG. 2, the AVHDDs 2a and 2b are shown collectively as the AVHDD 2. The STB 1 comprises a microprocessor 11 for controlling each component therein and serves as an isochronous resource manager (IRM) that is a node for isochronous resource management on the bus 40, The microprocessor 11 is connected to a tuner 12, a demodulator 13, an IEEE 1394 interface 14 (hereinafter referred to simply as "interface"), an infrared receiver 15, and a memory 16 (claimed computer readable storage medium).

The tuner 12 extracts a broadcast signal on a user-selected channel from broadcast signals received via an antenna 10. The demodulator 13 demodulates the broadcast signal extracted by the tuner 12 in accordance with the broadcasting method. The interface 14 is an interface circuit for sending and receiving data between the STB 1 and any other device on the bus 40. More particularly, the interface 14 sends and receives data to and from the DTV 3, the D-VHS tape recorder 4, and the AVHDD 2 (AVHDDs 2a and 2b) shown in FIG. 1 via the bus 40. The infrared receiver 14 receives an inked command signal transmitted from a remote control 20 and converts the command signal into a standard digital signal for output to the microprocessor 11. The memory 16 stores data such as e.g. a register space 17 containing various kinds of information concerning the node itself and the other nodes, a connection manager program 18 that is a program for managing connections between devices connected to the bus 40, and logical connection data 19 indicating logical connections existing between the connected devices that are established by the microprocessor 11 in accordance with the connection manager program 18.

The remote control 20 (selection means) has an infrared transmitter 21 and a key portion 24, where arranged are various keys such as a power key 23, numeric keys 25, cursor keys 26, an enter key 27, and a menu key 22 for causing various menus to be displayed. The keys on the remote control 20 are used, for example, to make various selections using various menus and to select connected devices to be logically connected to each other from among the connected devices on the bus 40 (the AVHDDs 2a and 2b, the DTV 3, the D-VHS tape recorder 4, and the STB 1 in FIG. 1).

The AVHDD 2 comprises a microprocessor 31 for controlling each component therein, a memory 28 for storing data such as e.g. a register space 29 containing various kinds of information concerning the node itself and the other nodes, and an IEEE 1394 interface (hereinafter referred to simply as "interface") 33 for receiving data such as e.g. a control command and stream data from the STB 1 or other device via the bus 40. The AVHDD 2 further comprises a plurality of hard disks 35 on which data is recorded, a plurality of magnetic heads 36 for recording and reading data on and from the hard disks 35, a head drive unit 34 for driving the magnetic heads 36, and a buffer memory 32 for temporarily storing data to be recorded or data read.

Figure 3:
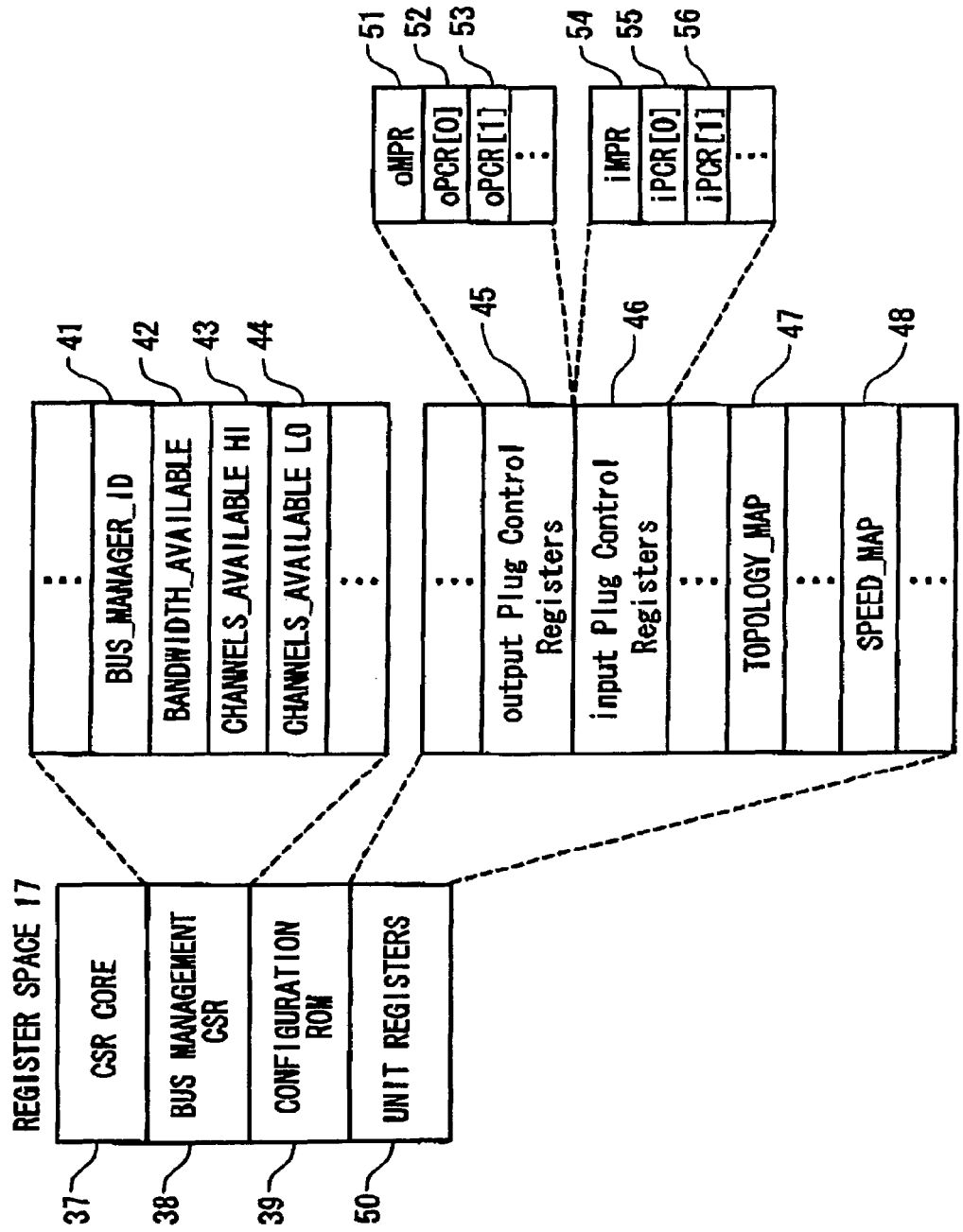
FIG. 3 shows the content of the register space shown in FIG. 2.

Referring now to FIG. 3, the content of data stored in the register space 17 is described. The content of the register space 17 shown in FIG. 3 is that in the case where the STB 1 serves not only as the IRM on the bus 40 but also as a bus management node (bus manager) on the bus 40. The register space 17 includes a control and status registers (CSR) core 37 used for controlling the node itself and the other nodes, bus management CSR 38 that are registers for management of the bus 40, a configuration ROM 39 that stores e.g. information about the performance of the device itself, and unit registers 50 that are registers specific to the device.

The bus management CSR 38 include a BUS_MANAGER_ID 41 containing the physical ID of the bus manager (STB 1 in this embodiment), a BANDWIDTH_AVAILABLE 42 that is a register for management of a band for isochronous transfer, and a CHANNELS_AVAILABLE HI 43 and a CHANNELS_AVAILABLE LO 44 that are registers for management of a channel for isochronous transfer.

The unit registers 50 include output plug control registers (hereinafter abbreviated as "oPCR") 45 that are registers for connection management for a connected device on data output side and input plug control registers (hereinafter abbreviated as "iPCR") 46 that are registers for connection management for a connected device on data input side. The oPCR 45 include output master plug registers (oMPR) 51 for controlling intrinsic attributes of the device, and oPCR[0] 52, oPCR[1] 53 . . . that are registers each corresponding to each channel. Likewise, the iPCR 46 includes input master plug registers (iMPR) 54 for controlling intrinsic attributes of the device, and iPCR[0] 55, iPCR[1] 56 . . . that are registers each corresponding to each channel.

Besides the above described oPCR 45 and iPCR 46, the unit registers 50 store a TOPOLOGY_MAP 47 (topology map) that contains information concerning connections existing between the nodes on the bus 40 and a SPEED_MAP 48 that contains information on the maximum rates of data transfer between the nodes at the physical layer level. The TOPOLOGY_MAP 47 and the SPEED_MAP 48 are created by the microprocessor 11 at the time of a bus reset.

Figure 4:
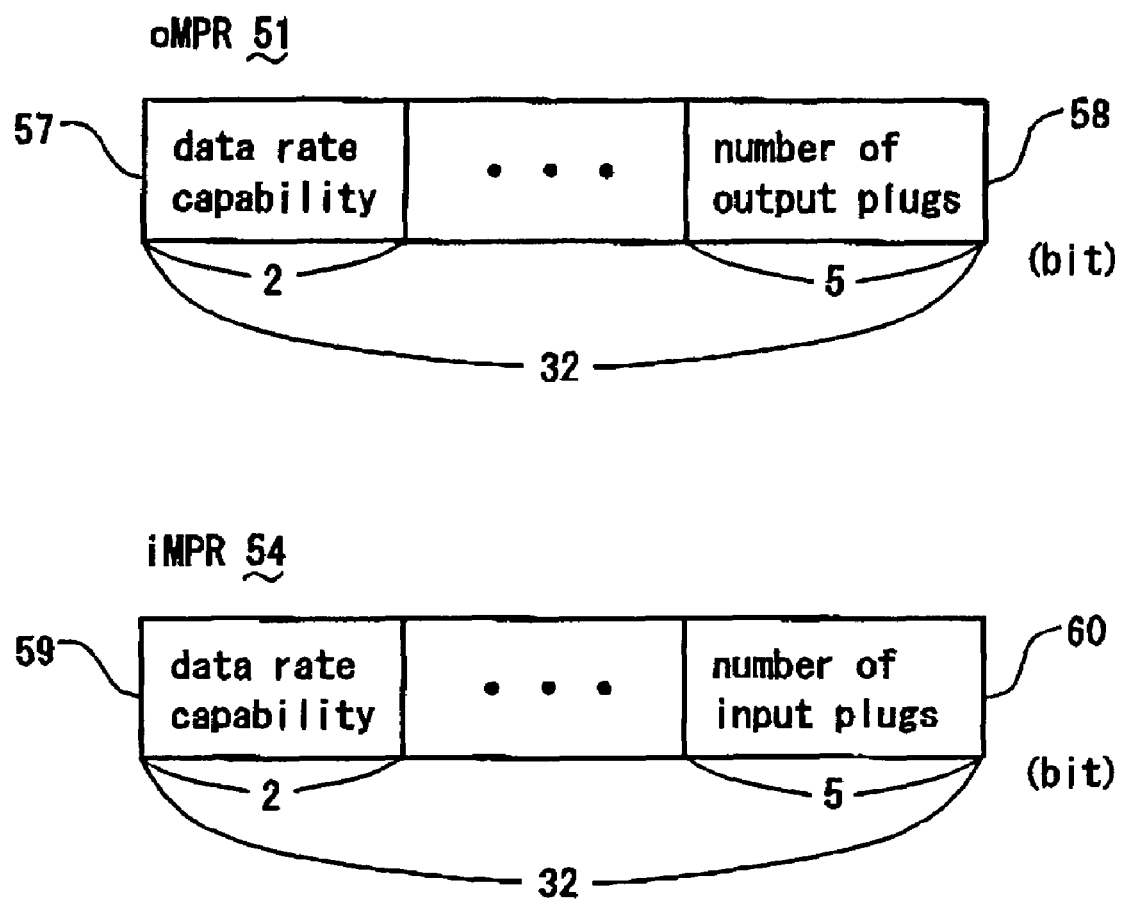
FIG. 4 shows the contents of the oMPR and the iMPR shown in FIG. 3.

Referring now to FIG. 4, the content of information stored in the oMPR 51 and iMPR 54 is described. The oMPR 51 stores e.g. a data rate capability 57 containing information on the maximum transfer rate at which the node can send data at the data link layer level, and a number of output plugs 58 that contains information on the number of output plugs the node has. Likewise, the iMPR 54 stores e.g. a data rate capability 59 that contains information on the maximum transfer rate at which the node can receive data at the data link layer level, and a number of input plugs 60 that contains information on the number of input plugs the node has.

Figure 5:
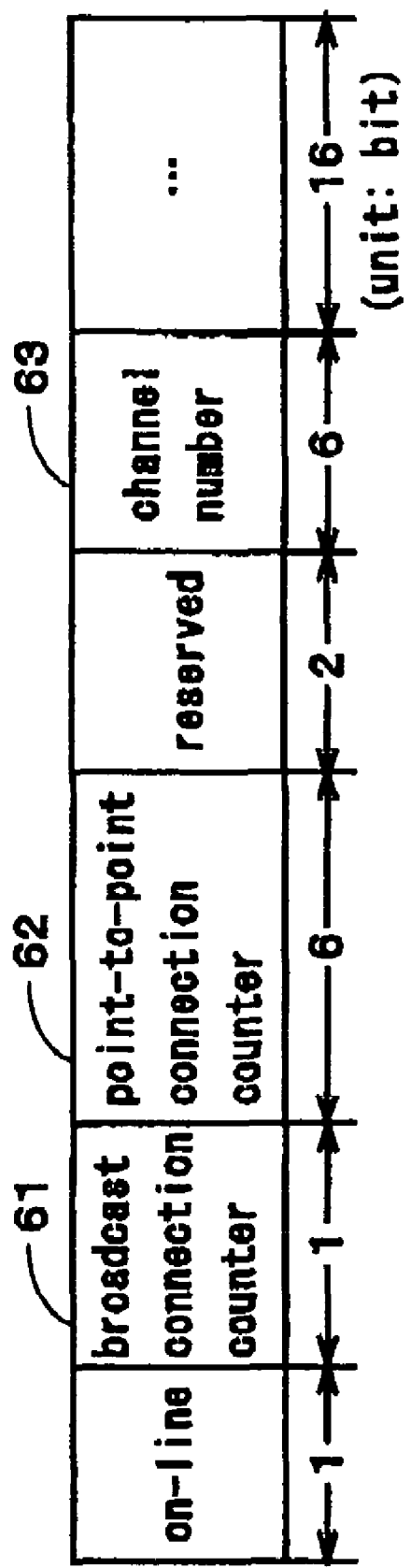
FIG. 5 shows the content of the oPCR[0] in FIG. 3.
Figure 6:
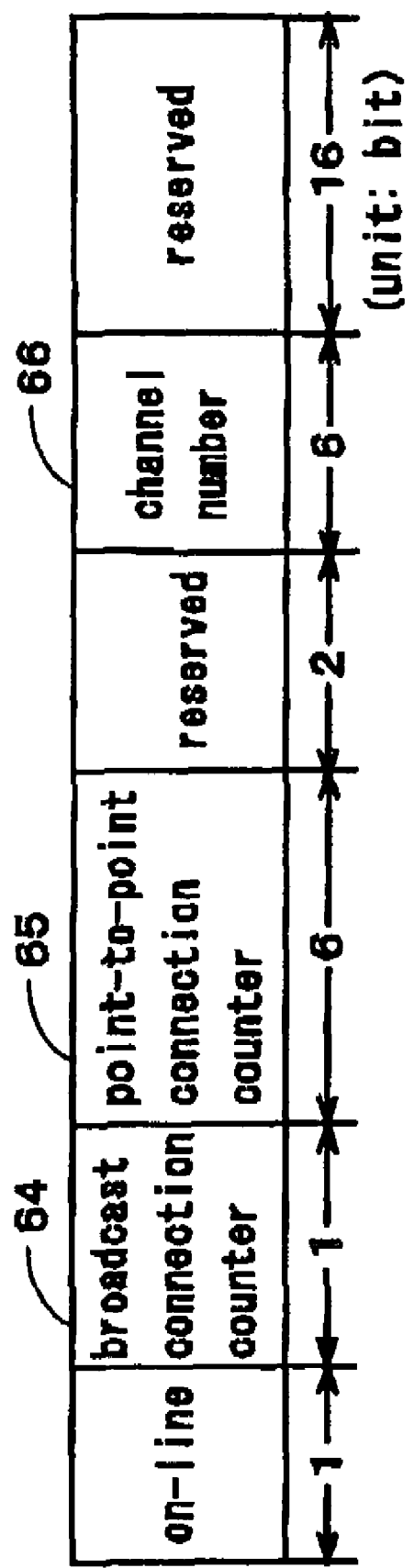
FIG. 6 shows the content of the iPCR[0] in FIG. 3.

FIG. 5 and FIG. 6 show the contents of the oPCR[0] 52 and the iPCR[0] 55 in FIG. 3, respectively. As shown in FIG. 5, the oPCR[0] 52 includes a broadcast connection counter 61 that is set to one when data is sent via a broadcast connection, a point-to-point connection counter 62 that is incremented when data is sent via a point-to-point connection, a channel number 63 that contains information on the number of a channel on the bus 40 that is used for sending data, and so on. Likewise, as shown in FIG. 6, the iPCR[0] 55 includes a broadcast connection counter 64 that is set to one when data is received via a broadcast connection, a point-to-point connection counter 65 that is incremented when data is received via a point-to-point connection, a channel number 66 that contains information on the number of a channel on the bus 40 that is used for receiving data.

Figure 7:
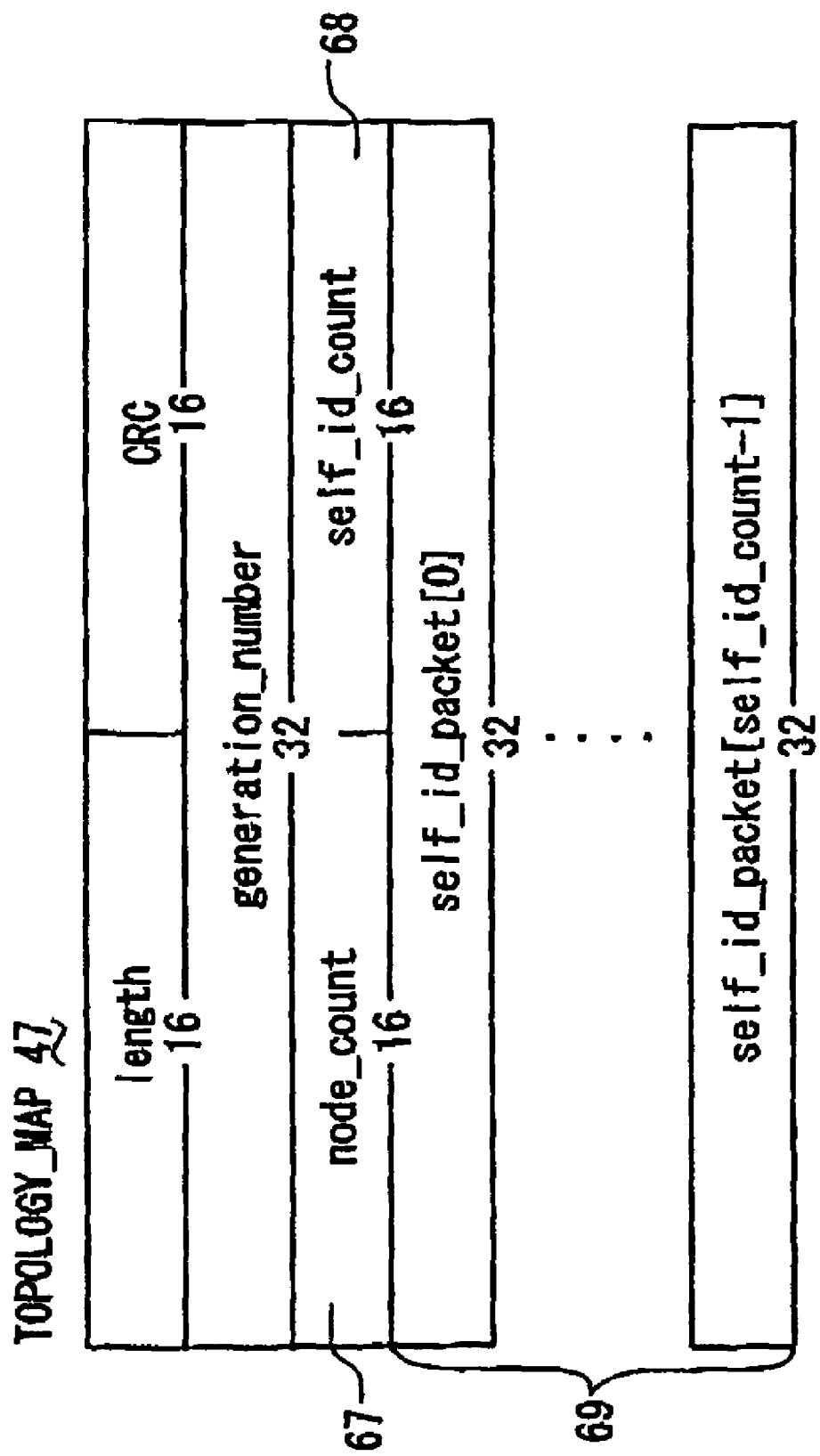
FIG. 7 shows the content of the TOPOLOGY_MAP in FIG. 3.

Referring now to FIG. 7, the content of information stored in the TOPOLOGY_MAP 47 shown in FIG. 3 is described. The TOPOLOGY_MAP 47 includes a node_count 67 that contains information on the number of nodes on the bus 40, a self_id_count 68 that contains information on the number of Self-ID packets stored in the TOPOLOGY_MAP 47, a Self-ID packet table 69 that contains Self-ID packets (self_id_packet[0] to self_id_packet[self_id_count-1]) of the respective nodes.

Figure 8:
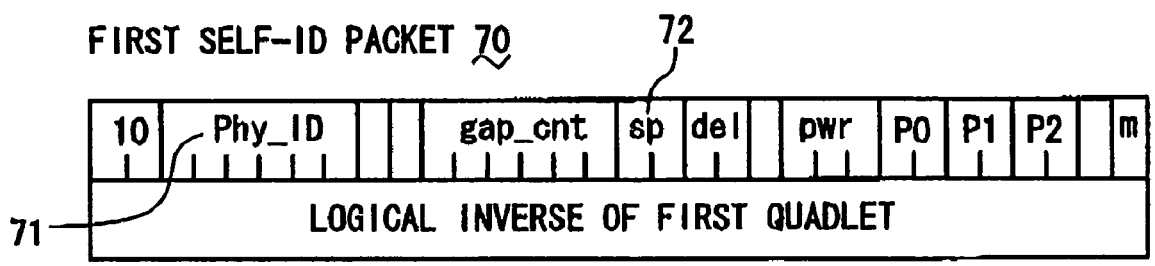
FIG. 8 shows the content of a first Self-ID packet contained in a Self-ID packet table in FIG. 7.
Figure 9:
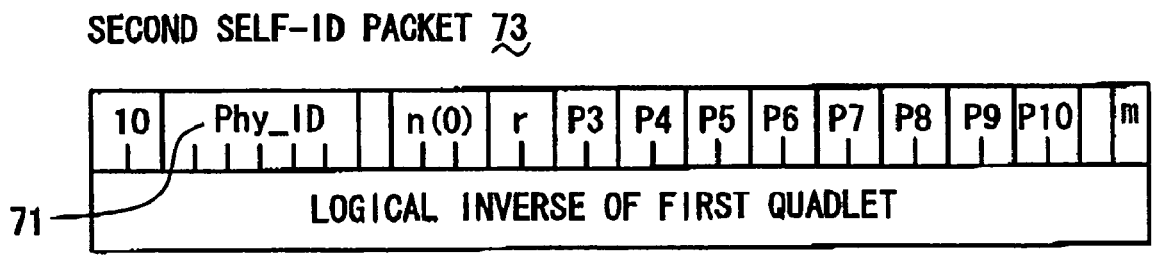
FIG. 9 shows the content of a second Self-ID packet contained in the Self-ID packet table in FIG. 7.
Figure 10:
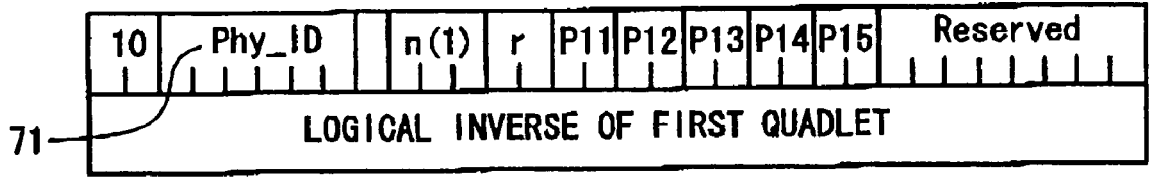
FIG. 10 shows the content of a third Self-ID packet contained in the Self-ID packet table in FIG. 7.

Referring now to FIG. 8 to FIG. 10, description is made as to the contents of three types of Self-ID packets in the Self-ID packet table 69 shown in FIG. 7. As shown in FIG. 8, a first type of Self-ID packet (hereinafter referred to as "first Self-ID packet") 70 stores a Phy_ID 71 indicating the physical ID of a node that has sent out the packet (hereinafter referred to as "sender node"), a sp 72 containing information on the maximum transfer rate of the sender node at the physical layer level, a P0 to a P2 indicating the statuses of ports 0 to 2 respectively, additional packet presence or absence information m indicating whether any more packet having the same physical ID follows or not, and so on. When the P0 to P2 are "11", they indicate "the relevant node is on and connected to the child port". When the P0 to P2 are "10", they indicate "the relevant node is on and connected to the parent port". When the P0 to P2 are "01", they indicate "the relevant node is off". When the P0 to P2 are "00", they indicate "the relevant port is not found".

As shown in FIG. 9, a second type of Self-ID packet (hereinafter referred to as "second Self-ID packet") 73 stores a Phy_ID 71 indicating the physical ID of a sender node, a P3 to a P10 indicating the statuses of ports 3 to 10 respectively, additional packet presence or absence information m indicating whether any more packet having the same physical ID follows or not, and so on. As shown in FIG. 10, a third type of Self-ID packet (hereinafter referred to as "third Self-ID packet" 74 stores a Phy_ID 71 indicating the physical ID of a sender node, a P11 to a P15 indicating the statuses of ports 11 to 15 respectively.

Figure 11:
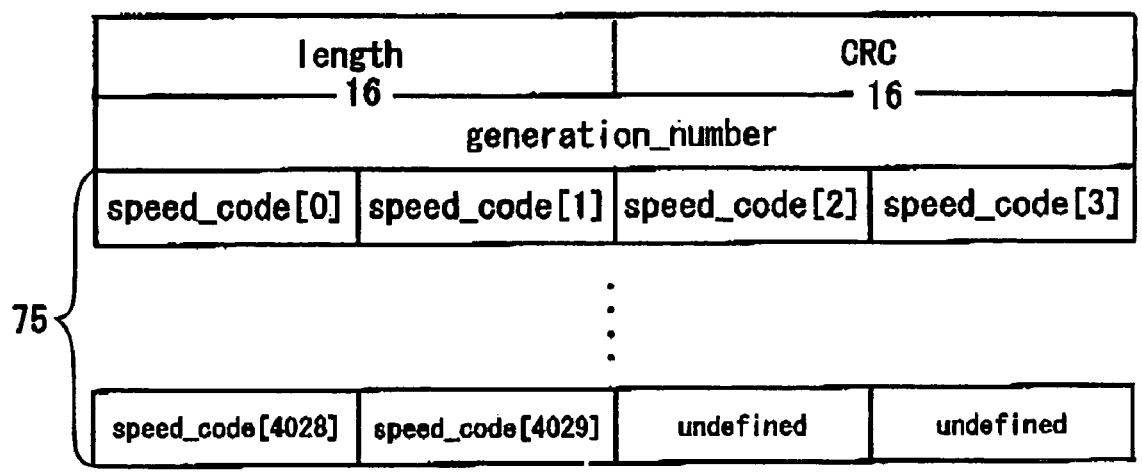
FIG. 11 shows the content of the SPEED_MAP shown in FIG. 3.

Referring now to FIG. 11, the content of information stored in the SPEED_MAP 48 shown in FIG. 3 is described. The SPEED_MAP 48 includes e.g. a length indicating the length of a block, cyclic redundancy check (CRC) code, and a speed code table 75 containing codes (speed_code[0]-[4029]) indicating maximum physical data rates (maximum data transfer rates at the physical layer level) between the connected devices on the bus 40.

The content of data stored in the register space 29 on the AVHDD 2 side is similar to that in the register space 17 on the STB 1 side. However, since the AVHDD 2 is not the IRM on the bus 40, no data is stored in the registers of the AVHDD 2 that correspond to the BANDWIDTH_AVAILABLE 42, CHANNELS_AVAILABLE HI 43, and CHANNELS_AVAILABLE LO 44 in the bus management CSR 38 shown in FIG. 3. Further, since the AVHDD 2 is not the bus manager on the bus 40, it does not have the TOPOLOGY_MAP 47 and the SPEED_MAP 48 as shown in FIG. 3.

Figure 12:
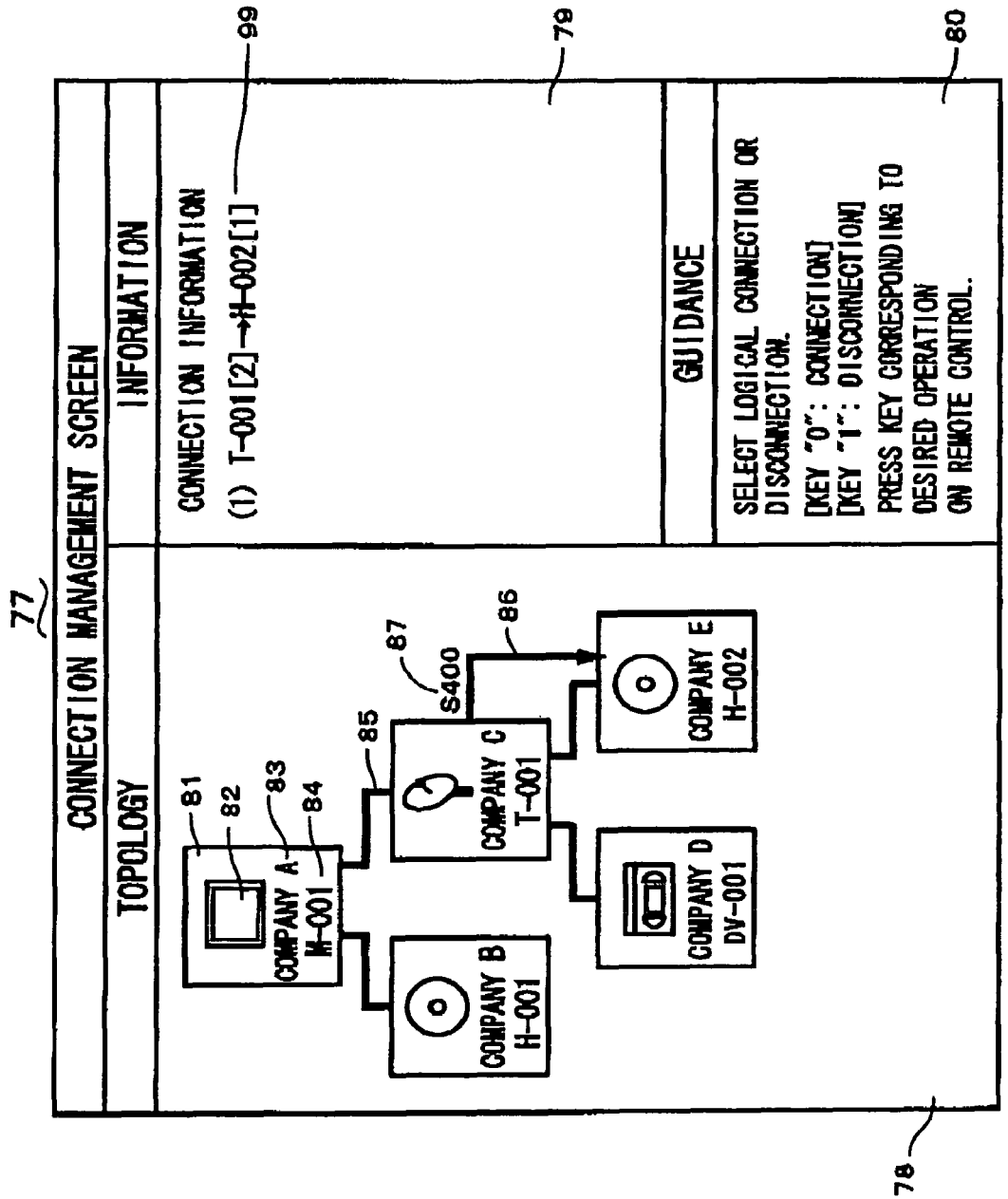

Referring now to FIG. 12, description is made as to a screen for management of connections between the devices connected to the bus 40 (hereinafter referred to simply as "connection management screen"). The connection management screen 77 is displayed on the monitor 6 of the DTV 3 based on image data output from the STB 1 in which the connection manager program 18 is installed. The connection management screen 77 shown in FIG. 12 is the initial screen. This connection management screen 77 includes a topology panel 78 for showing physical and logical connections that currently exist between the connected devices on the bus 40, a information panel 79 for showing a listing of information (hereinafter referred to as "connection information") 99 concerning logical connections between the connected devices that are established in accordance with the connection manager program 18 (see FIG. 2), and a guide panel 80 for prompting a user for a next input.

Displayed in the topology panel 78 are icons 81 representing the respective connected devices, in each of which an image 82 indicating the type of the connected device is displayed along with the manufacturer name 83 and the model designation 84 of the connected device. The microprocessor 11 of the STB 1 reads the vendor ID and model designation from the configuration ROM in each of the connected devices on the bus 40 in accordance with computer instructions in the connection manager program 18. Based on the read information, the microprocessor 11 edits the manufacturer name 83 and the model designation 84 in each of the icons 81. Further, the microprocessor 11 of the STB 1 sends an AV/C command for querying e.g. subunit information to each of the connected devices. Then, based on information such as a response to the command that is received from each of the connected devices, the microprocessor 11 determines what kind of device the connected device is so as to edit the image 82 indicating the type of the connected device. Furthermore, in accordance with the computer instructions in the connection manager program 18, the microprocessor 11 of the STB 1 reads the information of the TOPOLOGY_MAP 47 in the register space 17 of the STB 1 to edit a line (display of the line) 85 indicating a physical connection, and reads the logical connection data 19 in the memory 16 of the STB 1 to edit an arrow 86 indicating a logical connection between connected devices as well as a transfer rate 87. Note that, in the topology panel 78, the icons 81 with the model designations T-001, M-001, H-001, H-002, and DV-001 correspond to the STB 1, the DTV 3, the AVHDD 2a, the AVHDD 2b, and the D-VHS tape recorder 4 in FIG. 1, respectively.

Each piece of the connection information 99 displayed in the information panel 79 includes the number of a plug being used by the connected device for the relevant logical connection, which is inside brackets. For example, the information panel 79 in FIG. 12 indicates that the number of a plug being used on the T-001 side for the logical connection with the H-002 is "2 ", and the number of a plug being used on the H-002 side for the logical connection with the T-001 is "1". These plug numbers are edited based on the logical connection data 19 in the memory 16 of the STB 1. The information panel 79 in the connection management screen 77 shows the listing of the connection information 99 as shown in FIG. 12 in the initial state but it shows detailed information concerning each piece of the connection information 99 as shown in e.g. FIG. 18 in a state other than the initial state.

Figure 13:
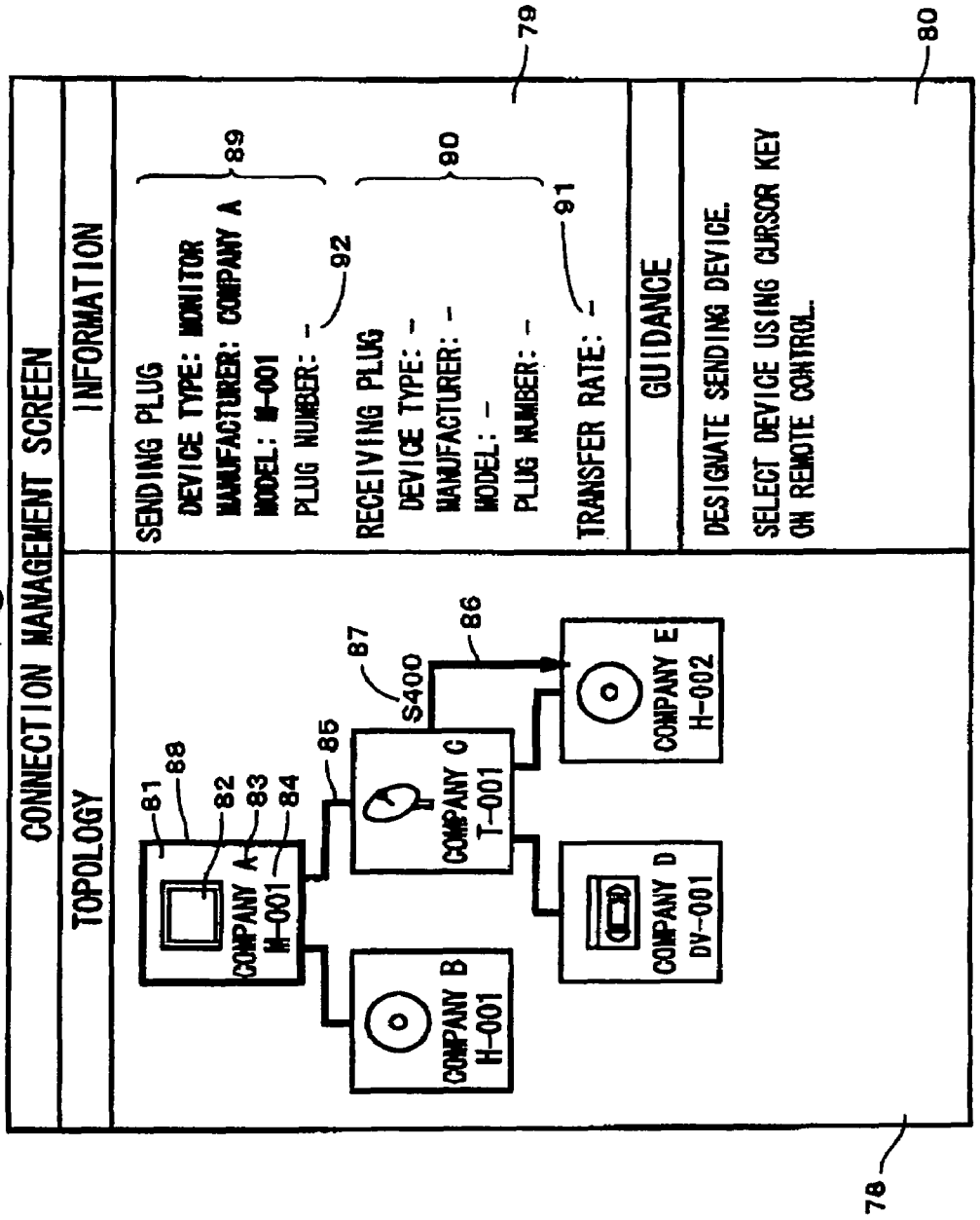
Figure 14:
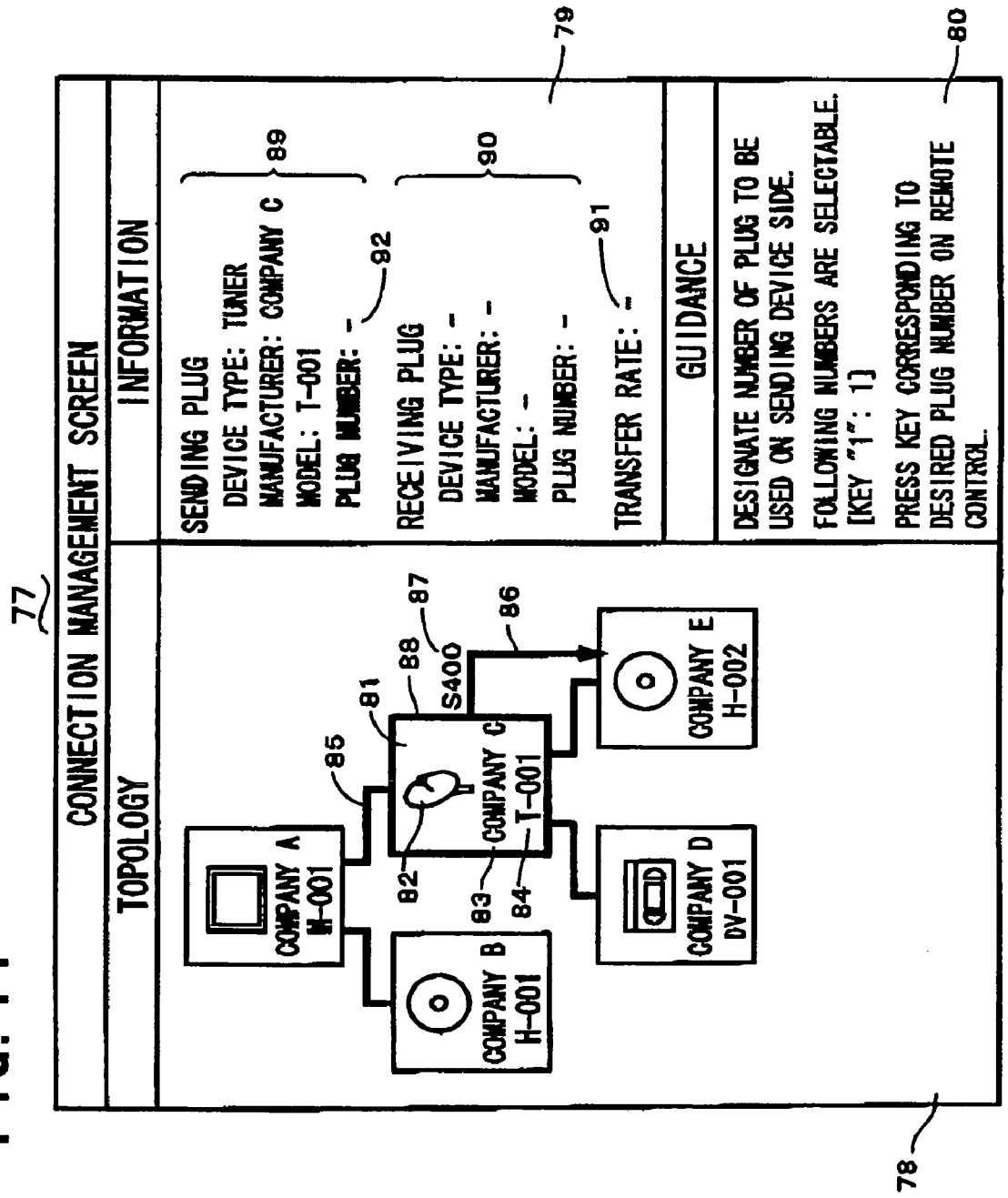

Referring now to FIG. 13 to FIG. 19 as well as FIG 12, a process of establishing a logical connection between connected devices is described that is performed by the microprocessor 11 of the STB 1 in accordance with the computer instructions in the connection manager program 18. When the connection manager program 18 is started, the microprocessor 11 of the STB 1 first displays the initial screen shown in FIG. 12 on the monitor 6 of the DTV 3 in accordance with the computer instructions in the connection manager program 18. In this state, when a user manipulates the numeric key 25 on the remote control 20 to select "Connection" following the guidance displayed on the guide panel 80, the microprocessor 11 of the STB 1 displays in the guide panel 80 guidance for prompting a user to designate a sending device as shown in FIG. 13 in accordance with the computer instructions in the connection manager program 18. Further, the microprocessor 11 sets a focus 88 on the icon 81 that has an image 82 representing a monitor (the icon 81 corresponding to a root device on the bus 40) on the topology panel 78 (highlights the icon 81), and highlights the type, manufacturer name, and model designation of the connected device corresponding to the icon 81 in a sending-plug section 89 on the information panel 79. Subsequently, the user sets the focus 88 on one of the icons 81 on the topology panel 78 that represents a desired device to be selected as a sending device by using the cursor key 26 on the remote control 20 and then selects the sending device using the enter key 27 on the remote control 20, following the guidance on the guide panel 80 shown in FIG. 13. In response to the selection, the microprocessor 11 of the STB 1 displays the type, manufacturer name, and model designation of the selected device in the sending-plug section 89 on the information panel 79 as shown in FIG. 14 in accordance with the computer instructions in the connection manager program 18. The microprocessor 11 then highlights "PLUG NUMBER: -" 92 in the sending-plug section 89 and displays a listing of selectable plug numbers on the guide panel 80 as shown in FIG. 14 to prompt a user to designate the number of a plug to be used on the sending device.

Figure 15:
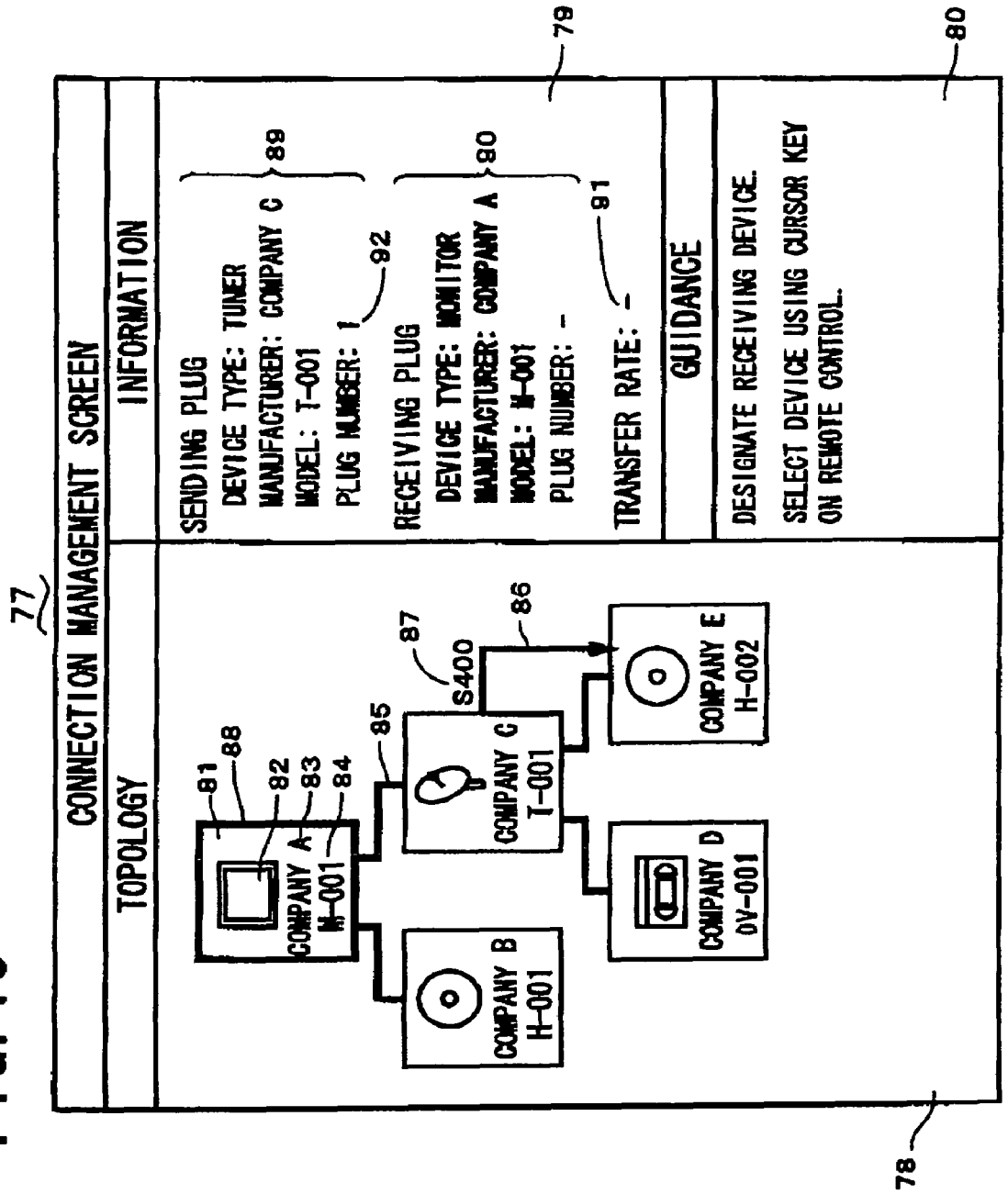
Figure 16:
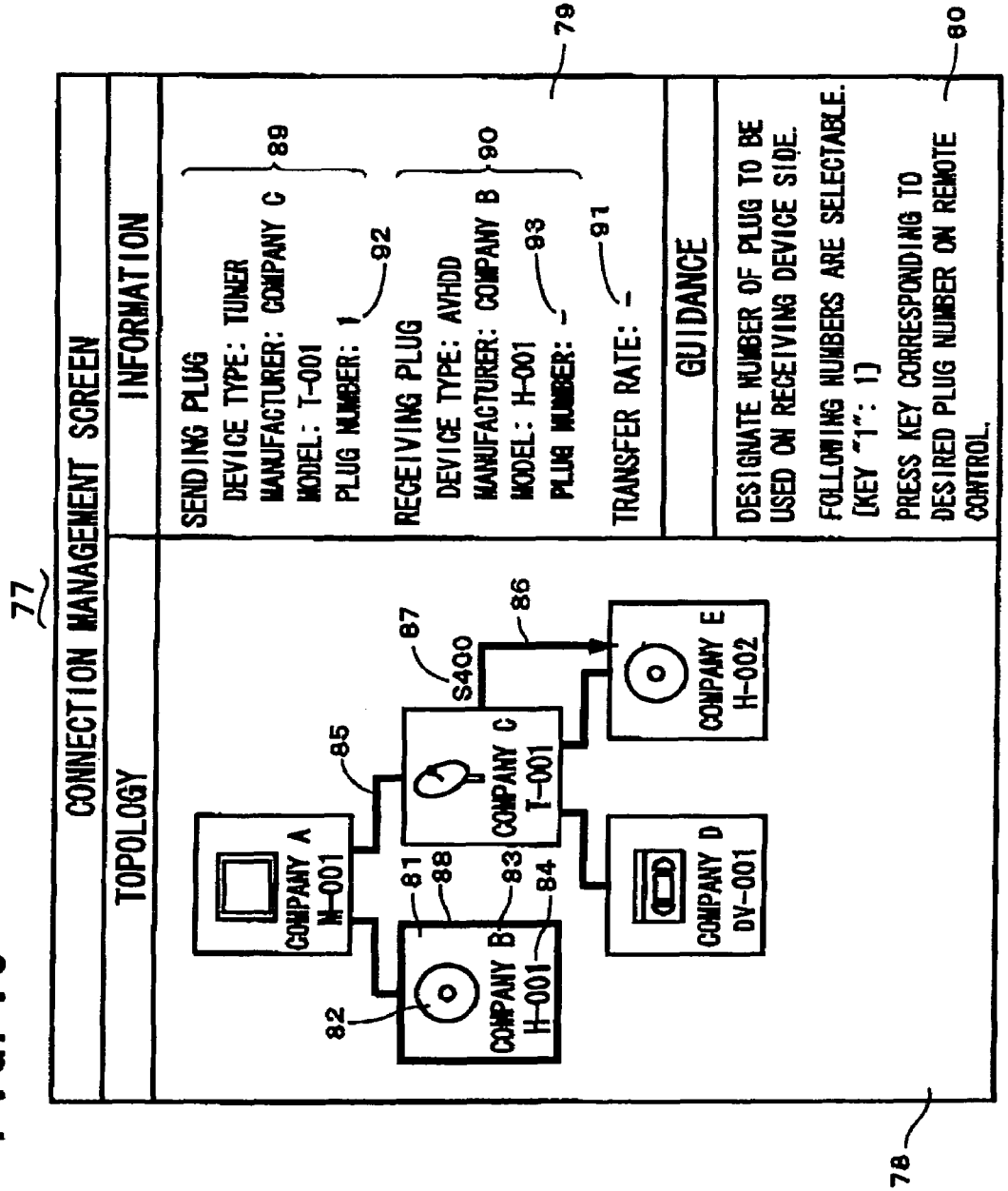

Subsequently, a user designates the number of a plug to be used on the sending device using the numeric key 25 on the remote control 20, following the guidance on the guide panel 80. In response, the microprocessor 11 of the STB 1 displays guidance for prompting the user to designate a receiving device on the guide panel 80 as shown in FIG. 15, in accordance with the computer instructions in the connection manager program 18. Upon change of the screen into this state, the microprocessor 11 of the STB 1 sets the focus 88 on the icon 81 representing the root device on the bus 40 that has the image 82 of monitor, as shown in FIG. 15, in accordance with the computer instructions in the connection manager program 18. Further, the microprocessor 11 highlights, in a receiving-plug section 90 on the information panel 79, the type, manufacturer name, and model designation of the connected device corresponding to the icon 81 with the focus 88 on the topology panel 78. Subsequently, the user sets the focus 88 on one of the icons 81 on the topology panel 78 that represents a desired device to be selected as a receiving device using the cursor key 26 on the remote control 20 and selects the receiving device using the enter key 27 on the remote control 20, following the guidance on the guide panel 80 shown in FIG. 15. In response, the microprocessor 11 of the STB 1 displays the type, manufacturer name, and model designation of the selected device in the receiving-plug section 90 on the information panel 79, as shown in FIG. 16, in accordance with the computer instructions in the connection manager program 18. Then, as shown in FIG. 16, the microprocessor 11 highlights "PLUG NUMBER: -" 93 in the receiving-plug section 90 and displays a listing of selectable plug numbers on the guide panel 80 so as to prompt the user to designate the number of a plug to be used on the receiving device side.

Figure 17:
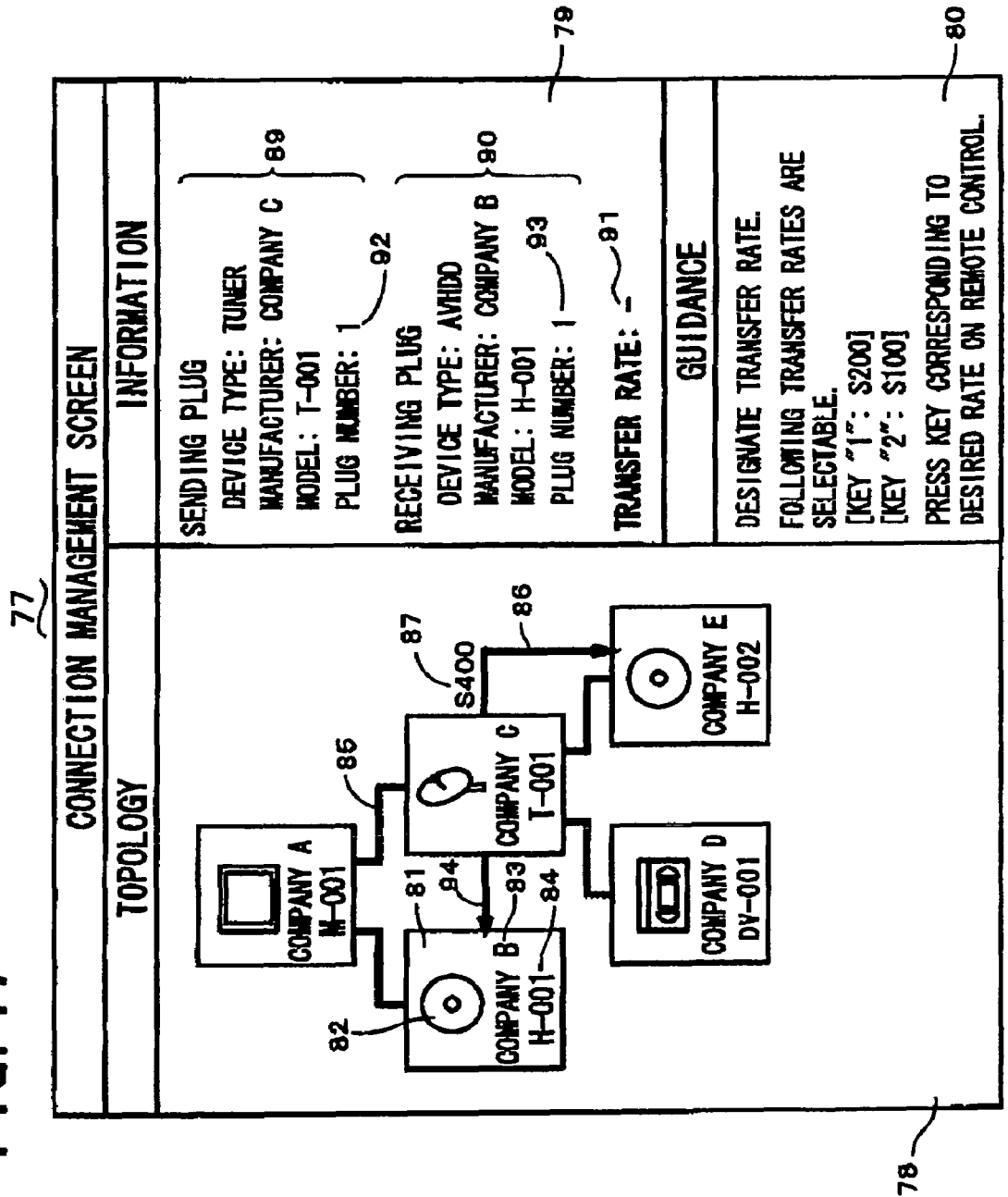

Subsequently, the user designates the number of a plug to be used on the receiving device side using the numeric key 25 on the remote control 20, following the guidance on the guide panel 80. In response, the microprocessor 11 of the STB 1 displays an arrow 94 indicating a logical connection between the icon 81 of the connected device selected as the sending device and the icon 81 of the connected device selected as the receiving device, as shown in FIG. 17, in accordance with the computer instructions in the connection manager program 18. Then, as shown in FIG. 17, the microprocessor 11 highlights a transfer rate section 91 on the information panel 79 and displays a listing of selectable transfer rates on the guide panel 80 so as to prompt the user to select a transfer rate.

Figure 18:
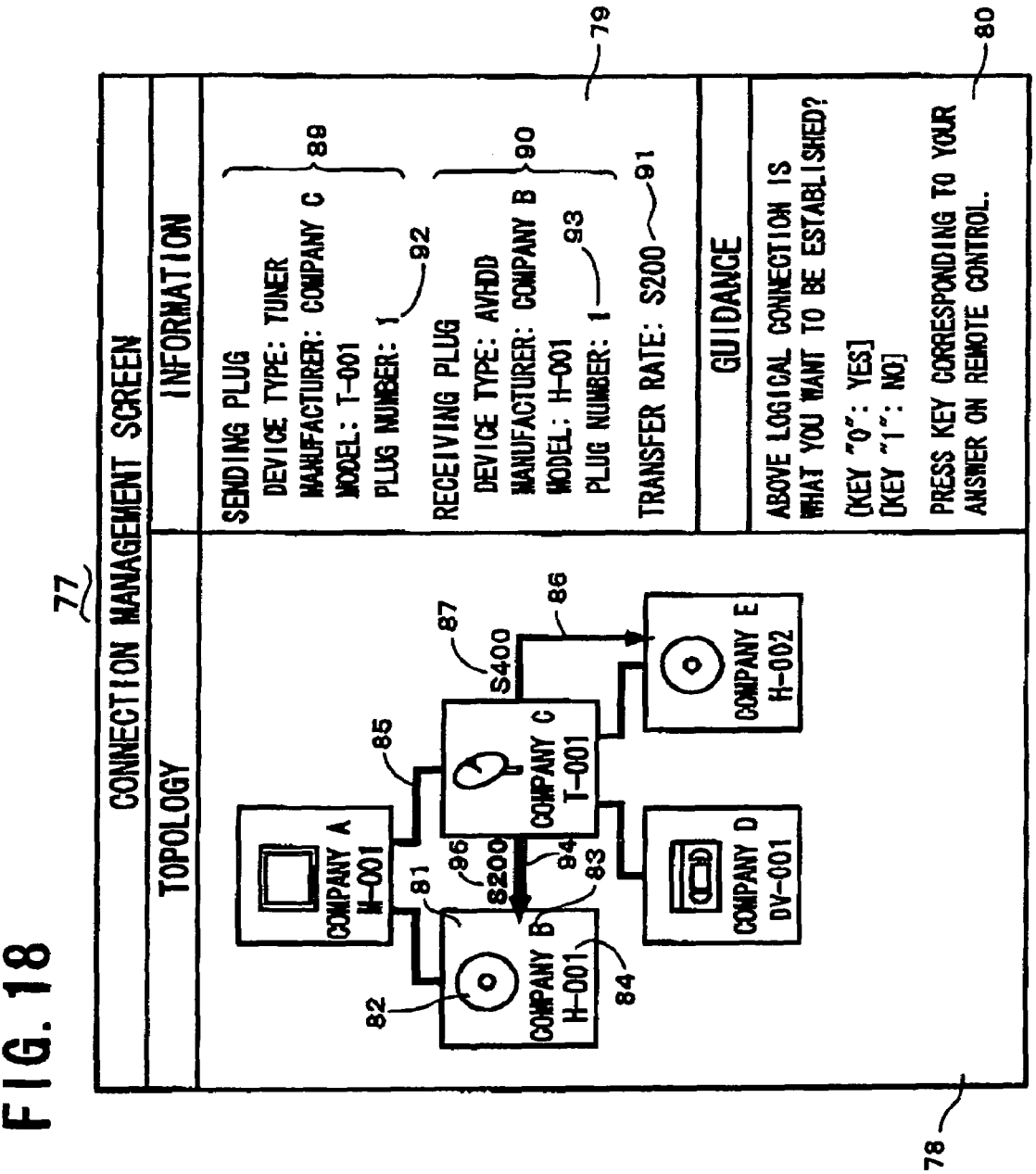

Subsequently, the user select a transfer rate using the numeric key 25 on the remote control 20, following the guidance on the guide panel 80. Then, as shown in FIG. 18, the microprocessor 11 of the STB 1 highlights the arrow 94 indicating the logical connection together with the transfer rate 96 on the topology panel 78 and displays on the guide panel 80 guidance for prompting the user to confirm the selection of the logical connection, in accordance with the computer instructions in the connection manager program 18.

Figure 19:
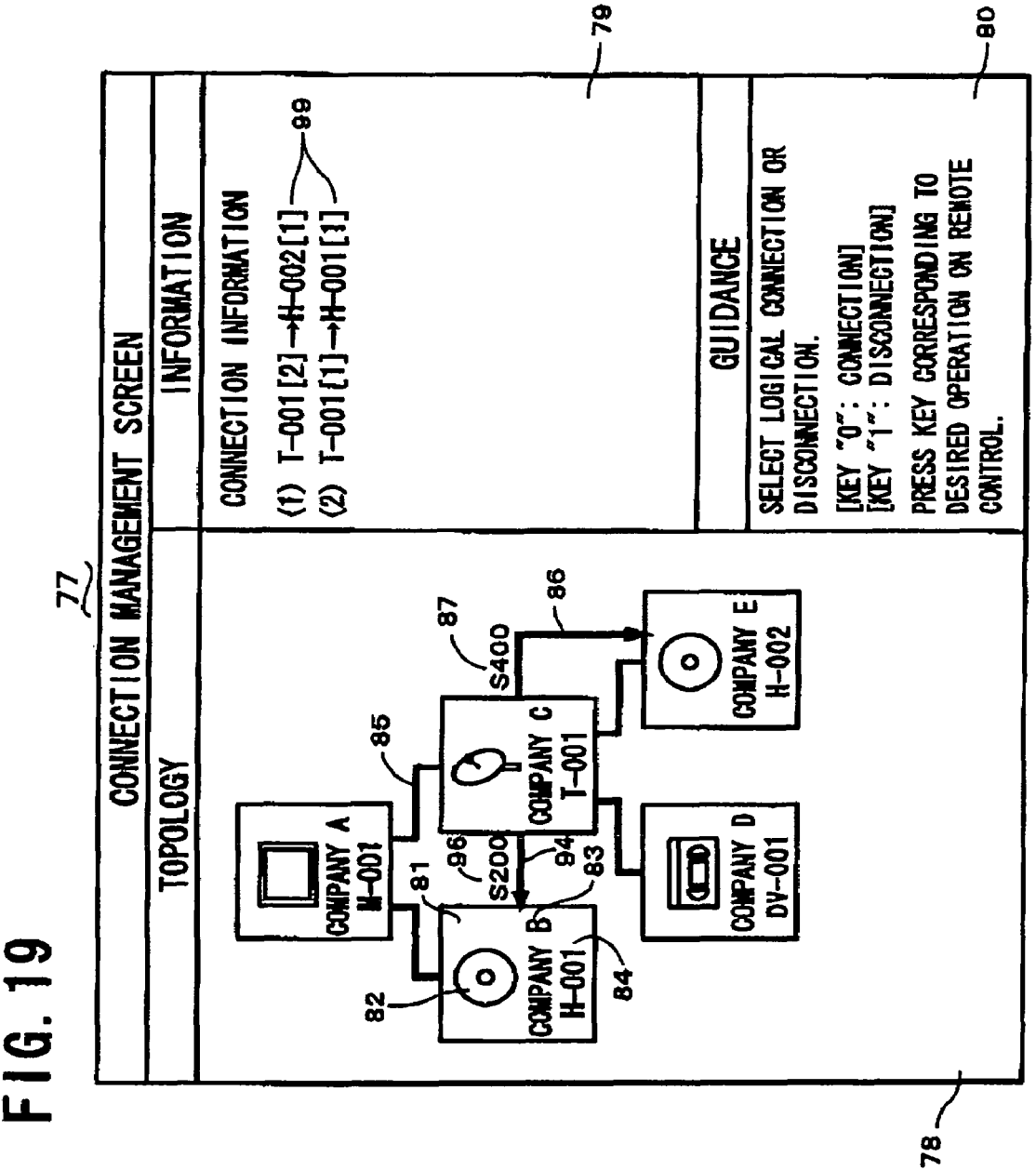

When the user selects "YES" using the numeric key 25 on the remote control 20 following the guidance on the guide panel 80, the microprocessor 11 of the STB 1 displays, as shown in FIG. 19, the connection management screen 77 in the initial state similar to that shown in FIG. 12 on the monitor 6 of the DTV 3 in accordance with the computer instructions in the connection manager program 18. In this state, when the logical connection corresponding to the above arrow 94 has been successfully established, the arrow 94 and the transfer rate 96 are normally displayed, not highlighted, on the topology panel 78 while a new piece of connection information 99 (denoted by "(2)") corresponding to the arrow 94 is displayed on the information panel 79. Accordingly, the user can easily check whether the new logical connection corresponding to the arrow 94 has been successfully established or not. In the case where the logical connection corresponding to the arrow 94 has been successfully established, the microprocessor 11 of the STB 1 stores data representing the logical connection and the transfer rate 96 in the logical connection data 19 in the memory 16. It is to be noted that the process performed by the microprocessor 11 of the STB 1 for establishing the above described logical connection includes: updating, when the logical connection is added in the above described manner, the contents of the iPCR and the oPCR in the register spaces in the two connected devices selected as the receiving device and the sending device; and updating, when the logical connection is added, the BANDWIDTH_AVAILABLE 42, CHANNELS_AVAILABLE HI 43, and CHANNELS_AVAILABLE LO 44 in the register space 17 in the STB 1 that serves as the isochronous resource manager on the bus 40.

Figure 20:
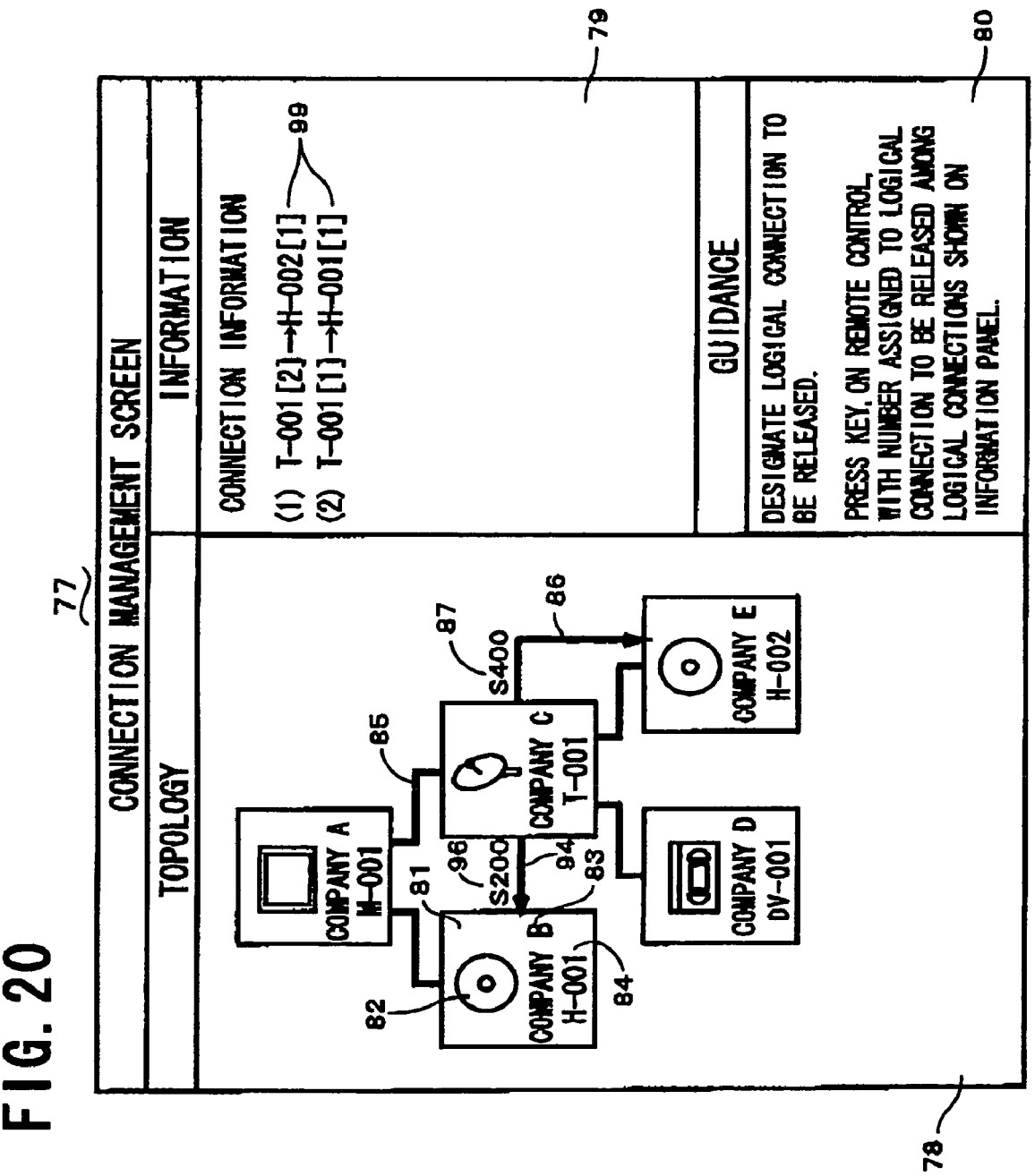
Figure 21:
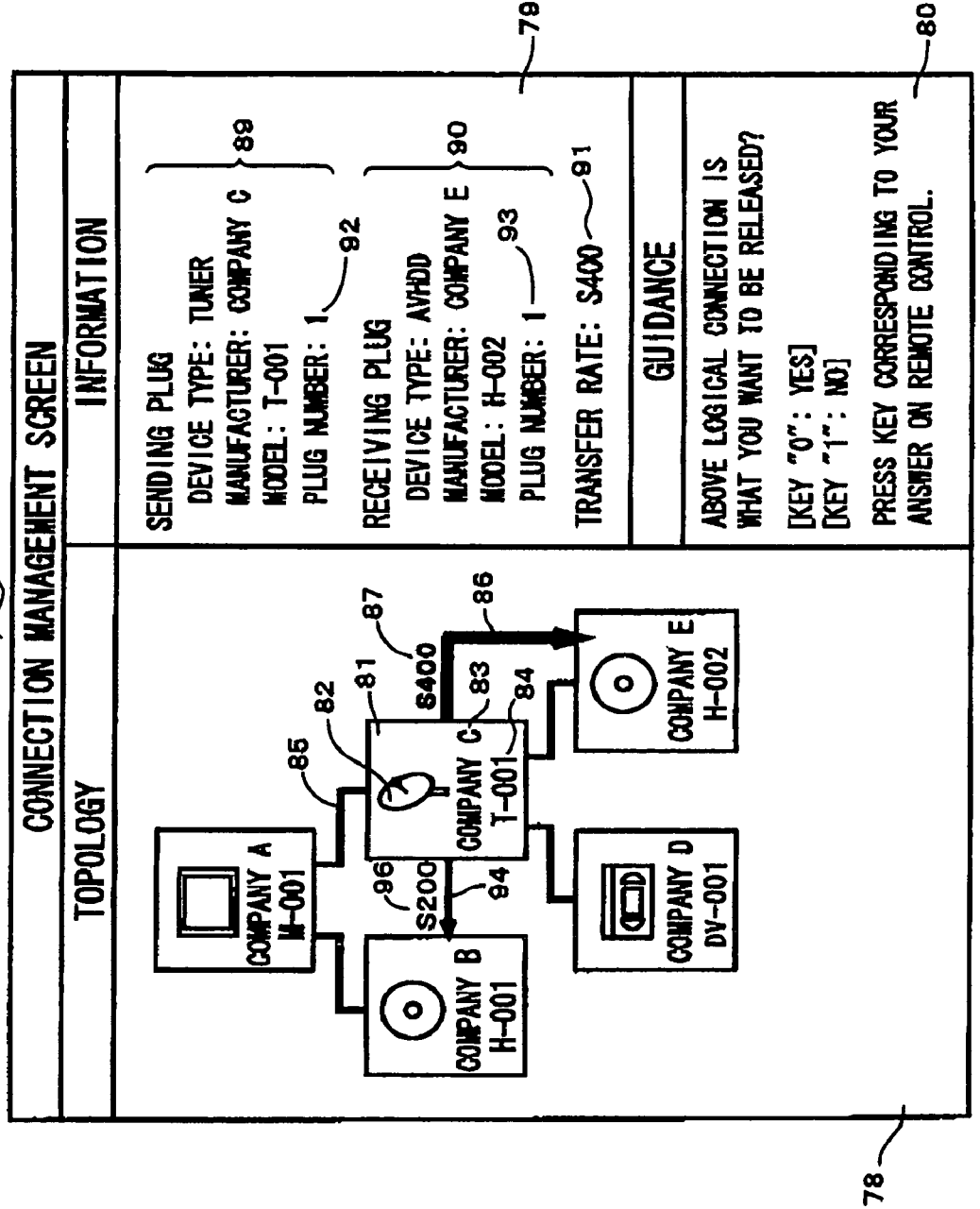
Figure 22:
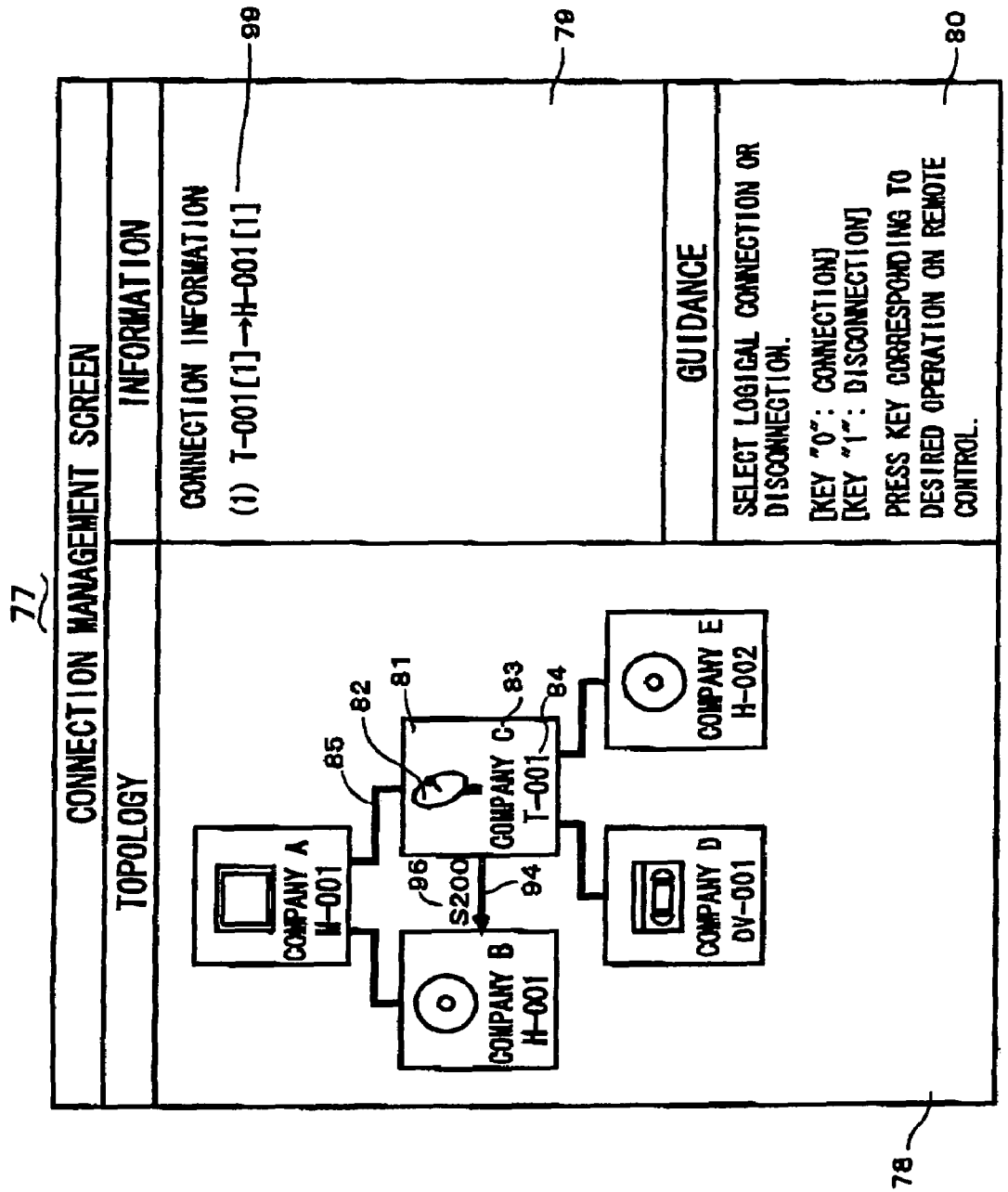
FIG. 22 shows a connection management screen displayed in accordance with the connection manager program according to the one embodiment of the present invention.
Figure 23:
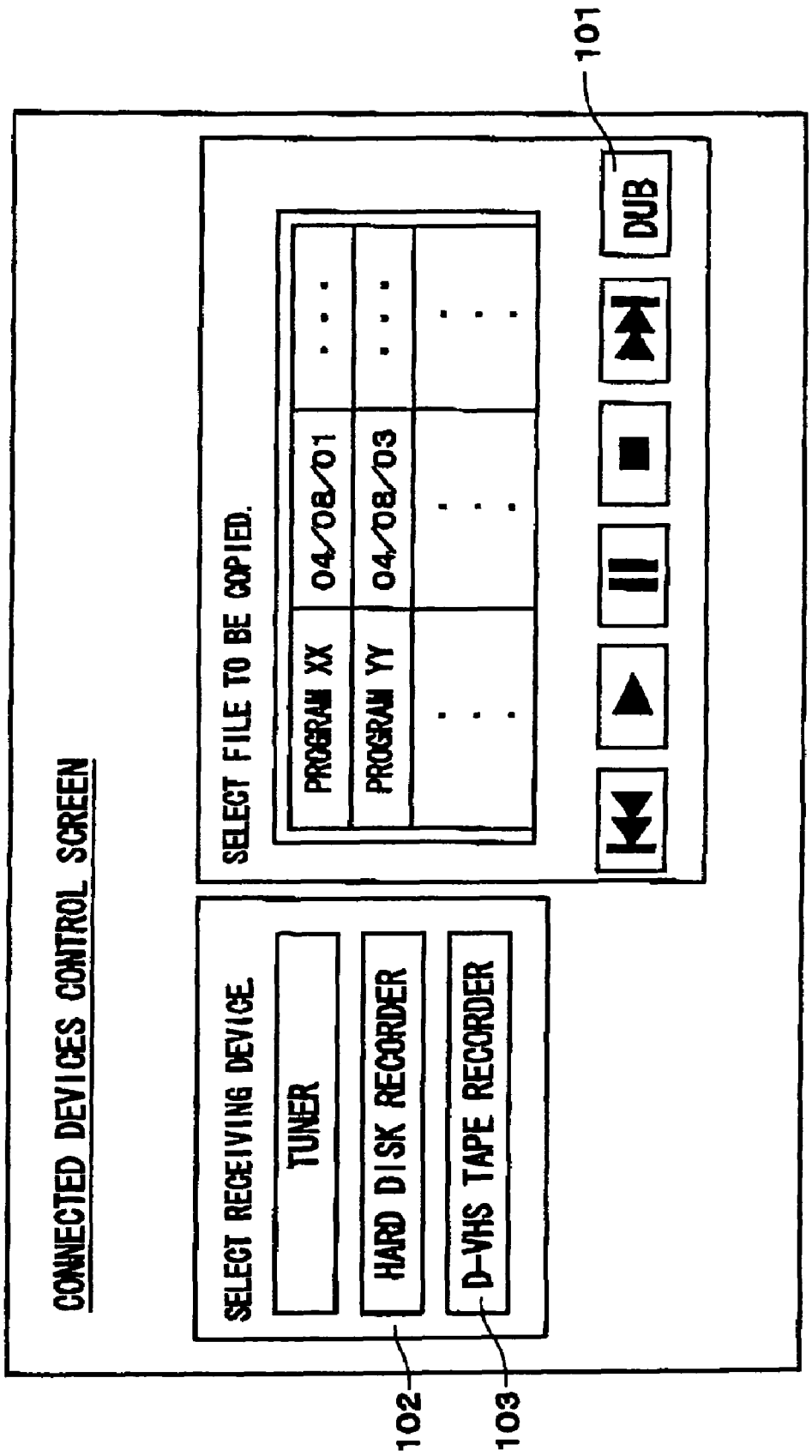
FIG. 23 shows an example of a screen used for the logical connection establishing process in the conventional controller.

Referring now to FIG. 20 to FIG. 22 as well as FIG. 19, a process of releasing a logical connection between connected devices is described that is performed by the microprocessor 11 of the STB 1 in accordance with the computer instructions in the connection manager program 18. This process starts when a user selects "DISCONNECTION" on the connection management screen 77 in the initial state shown in FIG. 19 by using the numeric key 25 on the remote control 20, following the guidance on the guide panel 80. In response to the selection, as shown in FIG. 20, the microprocessor 11 of the STB 1 displays on the guide panel 80 guidance for prompting the user to designate the number assigned to the piece of connection information 99 that corresponds to a logical connection to be released from among the numbers assigned to the respective pieces of connection information 99 on the information panel 79 in accordance with the computer instructions in the connection manager program 18.

Following the guidance on the guide panel 80, the user designates the number of a piece of connection information 99 using the numeric key 25 on the remote control 20. Then, as shown in FIG. 21, the microprocessor 11 of the STB 1 highlights an arrow 86 indicating the logical connection corresponding to the designated piece of connection information 99 together with a transfer rate 87, and displays on the guide panel 80 guidance for prompting the user to confirm the selection of the logical connection to be released in accordance with the computer instructions in the connection manager program 18.

When the user selects "YES" using the numeric key 25 on the remote control 20 following the guidance on the guide panel 80, the microprocessor 11 of the STB 1 displays, as shown in FIG. 22, the connection management screen 77 in the initial state similar to that shown in FIG. 12 on the monitor 6 of the DTV 3 in accordance with the computer instructions in the connection manager program 18. In this state, when the logical connection corresponding to the arrow 86 has been successfully released, the microprocessor 11 clears the arrow 86 and the transfer rate 87 from the topology panel 78 and clears the piece of connection information 99 that corresponds to the arrow 86 from the information panel 79. Further, in this case where the logical connection corresponding to the arrow 86 has been successfully released, the microprocessor 11 of the STB 1 erases the data concerning the corresponding logical connection as well as the transfer rate 87 data from the logical connection data 19 in the memory 16. It is to be noted that the process performed by the microprocessor 11 of the STB 1 for releasing the above described logical connection includes: updating the contents of the iPCR and the oPCR in the register spaces of the two connected devices having been connected to each other via the logical connection; and updating, when the logical connection is released in the above described manner, the BANDWIDTH_AVAILABLE 42, CHANNELS_AVAILABLE HI 43, and CHANNELS_AVAILABLE LO 44 in the register space 17 in the STB 1 that serves as the isochronous resource manager on the bus 40.

By installing the above described connection manager program 18 in the STB 1 that serves as a controller, the STB 1 is caused to, upon selection of two of the connected devices that are to be logically connected to each other, update the contents of the iPCR and the oPCR in the register spaces of the two connected devices and further update the BANDWIDTH_AVAILABLE 42, CHANNELS_AVAILABLE HI 43, and CHANNELS_AVAILABLE LO 44 in the register space 17 of the STB 1 that is the isochronous resource manager on the bus 40, thereby establishing the logical connection between the two connected devices. Accordingly, not only when the connected devices selected to be logically connected to each other are the STB 1 and its target device but also when the selected devices are both target devices as viewed from the STB 1, the STB 1 can establish the logical connection between the selected devices. In other words, the STB 1 can establish a logical connection between a freely-selected combination of connected devices on the bus 40.

Further, the STB 1 outputs the image including the icons representing the respective connected devices on the bus 40 in such a format that shows physical and logical connections existing between the connected devices for display on the topology panel 78. This allows a user to easily check to see whether the logical connection between the two connected devices has been successfully established or not. Besides, the user can easily know which connected devices have to remain physically connected to each other in order to maintain a currently active logical connection.

The present invention has been described above using a presently preferred embodiment, but those skilled in the art will appreciate that various modifications are possible. Accordingly, all such modifications are intended to be included within the spirit and scope of the present invention. For example, the connection manager program 18 according to the present invention is installed in the STB 1 that is the controller in the above described embodiment, but a controller in which a connection manager program according to the present invention is installed is not necessarily a set-top box (STB) but can be other controller such as a digital television, a DVD recorder, a hard disk recorder, or the like. Further, in the above described embodiment, the monitor 6 of the DTV 3 is used as the display means for displaying the image including the icons representing the respective connected devices on the IEEE 1394 serial bus, but a display provided on the controller itself can be used as the display means on which the image including the icons is displayed.

This application is based on Japanese patent application 2004-273222 filed Sep. 21, 2004, the contents of which are hereby incorporated by reference.

What is claimed is:

1. A computer program product for managing connections between devices connected to an IEEE 1394 serial bus, the computer program product comprising a computer readable storage medium having computer instructions for causing a controller to perform:

outputting an image including icons representing the respective connected devices on the IEEE 1394 serial bus to display means, wherein the image includes the icons representing the respective connected devices in such a format that shows physical and logical connections existing between the connected devices on the IEEE 1394 serial bus, including all physical daisy-chained connections comprising the physical connections and intermediate devices of the physical daisy-chained connections;

establishing a logical connection between two of the connected devices by updating contents of an input plug control register (iPCR) and an output plug control register (oPCR) stored in register spaces in the two connected devices and updating data for management of a band and a channel that is stored in a register space provided in an isochronous resource manager when a user enters a selection of the two connected devices to be logically connected to each other from among the connected devices on the IEEE 1394 serial bus, the isochronous resource manager being a node for isochronous resource management on the IEEE 1394 serial bus, reading a topology map from a bus manager that is a node for managing the IEEE 1394 serial bus, the topology map containing information concerning the physical connections existing between the connected devices on the IEEE 1394 serial bus; and editing the image including the icons representing the respective connected devices based on the content of the read topology map.

2. The computer program product according to claim 1, wherein the logical connection between the two connected devices is a point-to-point connection.

3. The computer program product according to claim 2, wherein the computer instructions cause the controller to perform: reading a topology map from a bus manager that is a node for managing the IEEE 1394serial bus, the topology map containing information concerning the physical connections existing between the connected devices on the IEEE 1394 serial bus; and editing the image including the icons representing the respective connected devices based on the content of the read topology map.

4. The computer program product according to claim 1, wherein the output image includes a transfer rate of the logical connection.

5. A method of managing connections between devices connected to an IEEE 1394 serial bus, the method comprising the acts of:

outputting an image to a display, the image including icons representing the respective connected devices on the IEEE 1394 serial bus, and physical and logical connections existing between the devices bus, including all physical daisy-chained connections comprising the physical connections and intermediate devices of the physical daisy-chained connections; and when a user enters a selection of the two connected devices to be logically connected to each other from among the connected devices on the IEEE 1394serial bus, establishing a logical connection between two of the connected devices by updating contents of an input plug control register (iPCR) and an output plug control register (oPCR) stored in register spaces in the two connected devices, and updating data for management of a bandwidth and a channel that is stored in a register space provided in an isochronous resource manager, reading a topology map from a bus manager that is a node for managing the IEEE 1394 serial bus, the topology map containing information concerning the physical connections existing between the connected devices on the IEEE 1394 serial bus; and editing the image including the icons representing the respective connected devices based on the content of the read topology map.

6. The method of claim 5, wherein the logical connection between the two connected devices is a point-to-point connection.

7. The method of claim 5, wherein the logical connection between the two connected devices is over a daisy-chained connected IEEE 1394 serial bus, and the act of displaying separately displays the physical and logical connections between the devices.

8. The method of claim 5, wherein the act of displaying includes displaying a transfer rate of the logical connection.

9. The method of claim 5, further comprising the act of:

outputting lists of selectable plug numbers to the display in order to prompt the user to select plug numbers to be used on the two connected devices; and outputting a list of selectable transfer rates to the display in order to prompt the user to select a transfer rate, wherein the act of establishing uses both the plug numbers selected by the user and the transfer rate selected by the user.

10. The method of claim 9, wherein the act of establishing includes updating the contents of the input plug control register and the output plug control register based on both the plug numbers selected by the user and the transfer rate selected by the user.

* * * * *